UNITED STATES PATENT OFFICE.

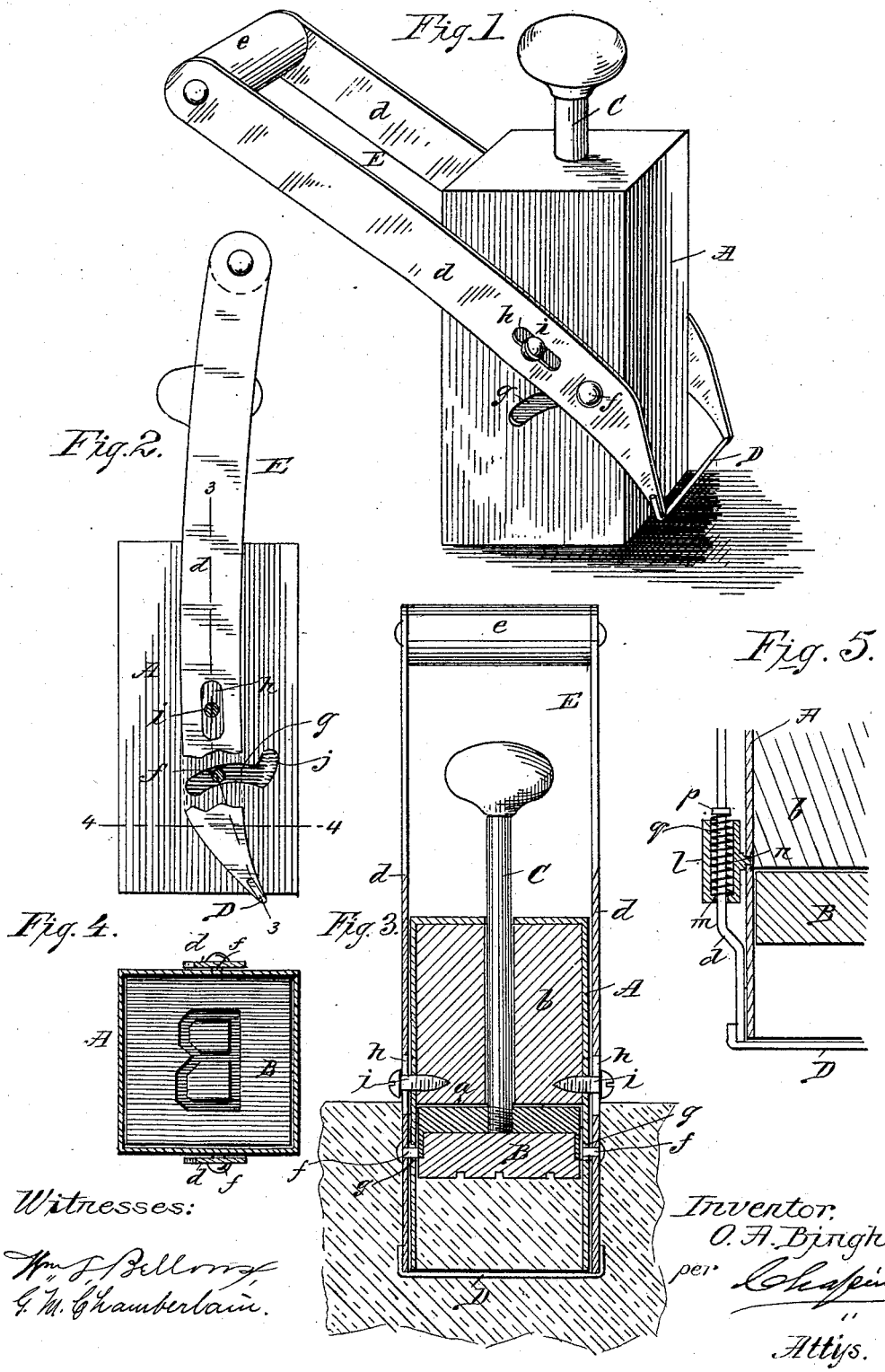

OSMORE A. BINGHAM, OF KEENE, NEW HAMPSHIRE.

BUTTER-MOLD.

SPECIFICATION forming part of Letters Patent No. 418,488, dated December 31, 1889.

Application filed April 11, 1889. Serial No. 306,845. (No model.)

*To all whom it may concern:*

Be it known that I, OSMORE A. BINGHAM, a citizen of the United States, residing at Keene, in the county of Cheshire and State of New Hampshire, have invented new and useful Improvements in Butter-Molds, of which the following is a specification This invention relates to improvements in devices for molding butter, it being intended, in the use of said device, that it be forced upon and into a mass of butter—as, for instance, when contained in a tub—whereby its mold-chamber becomes filled, and before being withdrawn to have, by a part comprised in the device, the butter at the open end of the mold-body severed from the main mass of butter and evened off, preferably in the plane of such open end; and the invention consists in the construction and combination of parts, all substantially as will hereinafter more fully appear, and be set forth in the claims.

In the accompanying drawings, forming a part of this specification, this invention is illustrated, and in said drawings similar letters of reference indicate corresponding parts in all the views.

Figure 1 is a perspective view of the mold constructed in accordance with the present invention, the severing and evening blade being shown as in the position it is caused to occupy before or after the mold has been forced into the mass of butter. Fig. 2 is a side elevation of the mold with its severing-blade as in a position occupied thereby in traversing the end of the mold while the end portion of said mold is forced into the mass of butter, a part of the carrying stirrup-frame for the said blade being broken away for purposes of clearer illustration. Fig. 3 is a vertical sectional view of the butter-mold, taken at right angles to Fig. 2, and on the plane indicated by the line 3 3, said mold being shown as forced into a mass of butter, whereby its mold-chamber becomes filled. Fig. 4 is a horizontal sectional and inverted plan view, the parts shown in section being on the line 4 4, Fig. 2; and Fig. 5 is a sectional view illustrative of a modification in construction hereinafter referred to.

The mold-body A consists of the rectangular or otherwise suitably-formed casing, open at its lower end, having in the intermediate portion of its chamber an abutment $a$, formed in any suitable manner, as by the squared end of a filling $b$ of wood, by the employment of which filling the casing, when formed of sheet metal, is rendered of greater rigidity and of less liability to become sprung; and below said abutment a plunger-block B is fitted to move in the chamber of the casing below said filling, said block being carried on the end of a spindle C, which moves vertically through said filling $b$ and the top of the mold-casing, and is provided at its upper end with a handle-knob for convenience of manipulation. The outer end of the said plunger-block B, which, when withdrawn to its innermost extent, forms the top wall of the mold-chamber, is to be engraved with a suitable character or configuration, if desired.

A rod or blade D is applied on a suitable carrier sustained on the mold-body, which blade and its carrier are capable of being disposed so that at the time the end of the said body is forced into a mass of butter no obstruction to the entrance of the butter into the mold-chamber will be interposed by said parts.

As preferably constructed, the carrying-frame E for the severing-rod D consists of the side arms $d\ d$, to the lower end of which said rod is secured, united at the upper end thereof by the cross-bar $e$. Studs $f\ f$ project a short distance beyond the inner faces of said side arms, and each is constrained to move in a curved slot $g$ in the adjacent side wall of the casing, and above said studs each arm has therein a longitudinally-extended slot $h$, through which a headed pin or screw $i$ passes and has a rigid connection in and with the mold-case. The wall of the said slot $g$ is formed on such a curve that as the stirrup-frame is swung upon the said pins $i\ i$, and its severing-rod D moves across the open end of the mold, instead of describing the arc of a circle, the studs on the arms impinge against the lower wall of said slot, and are forced, and the stirrup-frame therewith, so that the said rod D, carried by the end of said frame, moves in a plane coincident with that of the open end of the mold, and thereby the cake of butter has its lower surface flat. As will be noted on reference to Fig. 2, the said slot at one end has an upward extension $j$, in which the studs $i$ are disposed when the stirrup-frame and severing-rod D are swung, as shown in Fig. 1, and by which such swing is permitted. As will be obvious, such disposition of the severing-rod at one side of the mold-body at the time of molding permits of easier manipulation of the apparatus and insures more satisfactory results. Of course when it is not deemed necessary that the molded cake have a flat base, the rod-carrying stirrup-frame may be pivoted on the mold-body in the simplest and most usual manner of pivoting lever-arms, in which event the severing-rod would have a traverse to impart to the bottom of the cake a convex form. Manifestly, however, the device is to be preferably constructed to insure the projection of the severing-rod across and in the plane of the mouth of the mold, and, as would be apparent to a skilled mechanician other means for securing the described movement may be employed in lieu of the stud-and-slot construction hereinbefore described, and in Fig. 5 a bearing and connection for the stirrup-frame arms $d$ upon and with the mold-body is shown as consisting of a tubular casing $l$, having a seat $m$ at one end and provided with a lateral stud $n$, by which a pivotal connection with the mold-body is made. The arm of the stirrup-frame passes loosely through said casing and is provided with a shoulder $p$, between which and the seat in said casing a spiral spring $q$ bears, the tendency of which is to force the stirrup-frame upwardly and maintain the severing-rod, with a yielding pressure, however, against the end of the mold.

What I claim as my invention is—

1. The combination, with a chambered mold-body provided in its side walls with the curved slots $g$ $g$ and the studs $i$ $i$, and provided with the plunger-block forming the upper wall of the mold-chamber, of the stirrup-frame having in the arms thereof the slots $h$ and the studs $f$, and carrying the severing-bar D, substantially as and for the purpose described.

2. The combination, with a chambered mold-body provided in its side walls with the curved slots $g$ $g$, having the upward extensions $j$ $j$ and the studs $i$ $i$, and provided with the plunger-block forming the upper wall of the mold-chamber, of the stirrup-frame having in the arms thereof the slots $h$ and the studs $f$, and carrying the severing-bar D, substantially as and for the purpose described.

3. In combination, the casing A, having the filling $b$, occupying a portion of its height and forming by its end the abutment $a$, and provided in its side walls with the curved slots $g$ $g$, having the upward extensions $j$ $j$ and the studs $i$ $i$, the spindle C, longitudinally movable through said mold-casing and filling and carrying the block B, which forms the upper wall of the mold-chamber, and the stirrup-frame having in the arms thereof the slots $h$ and the studs $f$ and carrying the severing-bar D, substantially as and for the purpose described.

OSMORE A. BINGHAM.

Witnesses:
LOINE W. TOWNE,
W. L. MASON.